United States Patent Office 3,268,009
Patented August 23, 1966

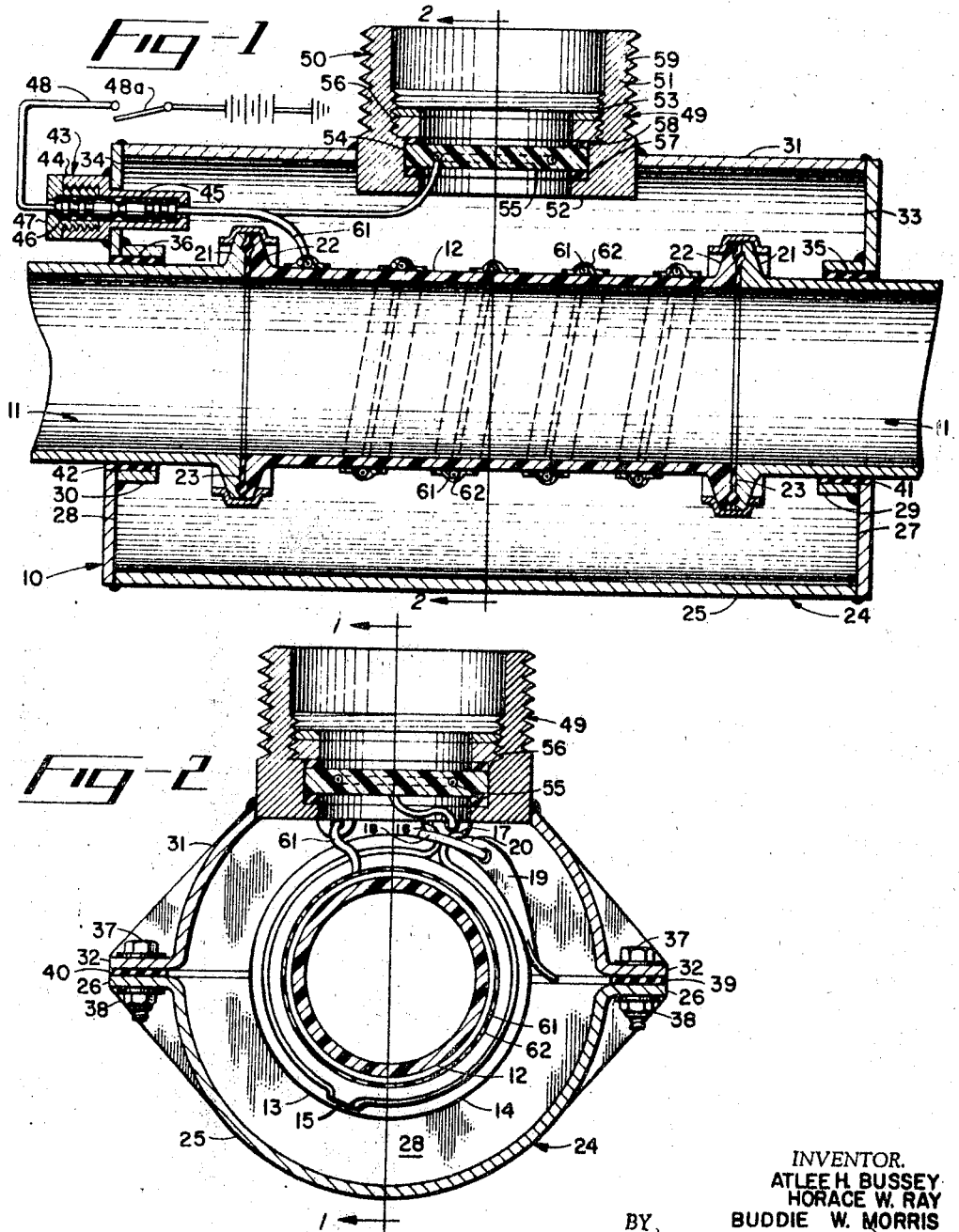

3,268,009
DELUGE DEVICE FOR EXTINGUISHING
FIRE IN PIPELINE
Atlee H. Bussey and Horace W. Ray, Pasadena, and Buddie W. Morris, Anaheim, Calif., assignors to Aerojet-General Corporation, Azusa, Calif., a corporation of Ohio
Filed June 4, 1963, Ser. No. 285,852
3 Claims. (Cl. 169—16)

This application is a continuation-in-part of our co-pending U.S. patent application, Serial No. 131,272, filed August 14, 1961, now abandoned.

This invention relates in general to means for extinguishing fires and more particularly to extinguishment of fires in pipelines carrying inflammable fluids and purging burning fluids from said lines.

In many installations, such as the fuel lines in aircraft or rockets, fires may start in the lines due to a variety of causes and it becomes vitally important to not only extinguish the fire in the line but to purge the burning material from the vehicle before it can spread, which action should be taken in the shortest possible time.

Various quick-acting valves have been proposed, some actuated by explosive means, effective to admit fire extinguishing agents to a pipeline, or to open valves in a pipeline, but to the best of our knowledge it has not been previously proposed to both admit fire extinguishing agents to a pipeline and purge the line of fluid. The present invention provides such an explosively operated deluge device which is adapted to be mounted in a run of a pipeline carrying inflammable fluids. The term "deluge" indicates a device rapidly supplying a large volume of fire extinguisher where needed.

It is therefore an object of the present invention to provide means for effecting substantially instantaneous release of fluid without a need for moving parts.

It is another object of this invention to provide an explosive operated deluge device which may be operated by means spaced from the device to admit fire extinguishing fluid to a pipeline without shutting off said pipeline.

It is still another object of this invention to provide a device capable of supplying a large flow of fire extinguishing fluid into a pipeline, which device will operate virtually instantaneously by explosive means.

It is a further object of the invention to provide a device of the kind above referred to which delivers the fire extinguishing fluid into a pipeline without cutting off the flow through the line and thus is effective to purge the line.

A still further object of the invention is to provide a deluge device operated by explosive means which is mounted on a pipeline carrying inflammable or other dangerous material, which device may be put into action by means spaced therefrom.

A still further object is to provide an explosively operated deluge device, all parts of which may be readily installed in position on a length of pipeline and wherein the parts destroyed by the explosive may be readily replaced.

A further object is to provide an explosively operated deluge device of simple and inexpensive construction.

Still further objects and features of the invention will appear from the following description and accompanying illustrative drawings.

In the accompanying drawings:

FIG. 1 is a longitudinal sectional view showing the device mounted on a pipeline carrying propellant, taken along the line 1—1 of FIG. 2; and FIG. 2 is a transverse sectional view taken along the line 2—2 of FIG. 1.

Referring now to FIG. 1, the numeral 10 indicates generally the device of this invention interposed in a pipeline 11 carrying liquid propellant. It is to be understood, however, that this device may be successfully employed in a pipeline carrying any fluid-like or flowing materials, such as slurries. The device comprises a section of pipe 12 of frangible material such as hard plastic which may be shattered by a powerful shock. A suitable material for the length of pipe 12 can be any of a number of different glass compositions or plastics having satisfactory strength and resistance requirements.

The pipe 12 is held securely but removably in position so as to be interposed as a pipe section in pipe 11. In this respect, each end of the pipe section 12 is connected to a corresponding end of a segment of the pipe 11 by readily releasable means such as a two part clamp having a pair of semi-circular sections 13 and 14 of channel section flexibly connected together at one end 15 and provided with hooks 16, 17 at their free ends, drawn together by a link 18 pivoted in the head of a small lever 19 having a nose 20 bearing against one hook while the link 18 bears under the opposite hook. When the tail of lever 19 is forced downwardly toward pipe section 12, the hooks 16 and 17 will be drawn together.

The facing ends of the axially spaced segments of pipe 11 are upset to provide thickened ridges 21 diminishing outwardly in thickness. Similar end ridges 22 are formed at the ends of the pipe section 12. A channel-section clamp fits over the thick end rims of each of the respective segments of pipe 11 and the coresponding end of the inserted pipe section 12. A seal 23 of suitable material is positioned between each of the respective ends of the segments of pipe 11 and the corresponding end of the inserted section of frangible pipe 12 opposed thereto. When the respective clamps are tightened, the opposed ridges 21, 22 of the two sets thereof are brought toward each other, compressing the seals 23 interposed between each respective set of ridges 21, 22 to provide a fluid-tight joint between each end of the frangible pipe section 12 and the ends of the axially spaced segments of pipe 11 opposed thereto.

A readily removable housing 24 rigidly connects the segments of pipe 11, the housing 24 being disposed in straddling relationship over the section of frangible pipe 12. The housing 24 comprises two semi-cylindrical portions, as shown in the drawings, though it will be obvious that any ridged and fluid-tight construction may be used.

The lower half of the housing 24 comprises a semi-cylindrical wall 25 with outwardly turned longitudinal flanges 26 (FIG. 2) and semi-circular end walls 27 and 28 provided with flanges 29 and 30 adapted to be respectively disposed about the surfaces of the segments of the pipe 11.

The upper half of the housing 24 is formed identically to the lower half and comprises a semi-cylindrical wall 31 with outwardly turned longitudinal flanges 32 and semi-circular end walls 33, 34 provided with flanges 35 and 36 adapted to be respectively disposed about the surfaces of the segments of the pipe 11.

The upper and lower halves of the housing 24 are clamped together by small bolts 37 passing through holes in flanges 26 and 32 and tightened by nuts 38. Gaskets 39 and 40 are respectively placed between the sets of opposed flanges 26 and 32, while annular gaskets 41 and 42 are respectively provided between the flanges 29, 35 and 30, 36 and the surfaces of the segments of the pipe 11, the construction being effective to prevent flow of fluid out of the housing 24 when rupturable pipe section 12 is disintegrated.

The means for destroying pipe section 12 when required comprises a length 61 of "Primacord" wound helically around the surface of pipe section 12 and held in position by adhesive tape 62. "Primacord" 61 is provided as a plastic tube filled with a high explosive which is adapted to be detonated, the initiating means illustrated for effecting the detonation of the high explosive being indicated at 43 in FIG. 1.

The initiating means 43 comprises a tubular socket 44 which is welded to end wall 34 and projects into housing 24. A cartridge 45 containing primer material is inserted in socket 44, the end of the length of "Primacord" 61 being inserted through a hole in the end of the socket 44 into the primer cartridge 45. To ignite the primer cartridge 45, an electrically fired squib 46 is positioned against the primer cartridge 45 and clamped in position by hollow stud 47 which is screwed into the socket 44. The electrical wire 48 for firing the squib 46 is connected to the squib 46, the wire 48 being led through a hole drilled in the hollow stud 47 and extending to a switch 48a which when closed will complete an electrical circuit drawing electrical power from a battery or other source of energy.

It is the essential novelty of the invention that fire extinguishing fluid will be injected into housing 24 at the same time that the frangible length of tube 12 is destroyed. To this end, means 49 are provided, the means 49 comprising a tubular mounting member 50 which is welded in place so as to extend through an opening in housing 24.

Member 50 includes a tubular body 51 having a radially inwardly projecting annular flange 52 at its inner end and an internally threaded portion 53 adjacent to but spaced outwardly from flange 52.

A rupturable closure disc 54, cast with a coil 55 of "Primacord" embedded therein, is positioned on said flange 52 and clamped in place by a threaded ring 56 screwed into the internally threaded portion 53 of tubular body 51. The coil 55 of "Primacord" embedded in disc 54 may be circular and generally concentric with the tubular body 51 in which disc 54 is positioned, as shown, or may lay in other configurations transverse to the passage through the tubular body 51 within the concept of the invention. Examples of alternate configurations are an S-shaped pattern, not shown, or a folded pattern, not shown, which would provide minimum desired spacing of explosive transverse to the passage in which the disc 54 is positioned. Although the outer lay of coil 55 may be positioned close to the edge periphery of disc 54, it has been found preferable to have the outer lay of coil 55 either entirely interior of or substantially entirely interior of a line extending between the inner surfaces of ring 56 and flange 52. Preferably, washers 57 and 58 are positioned between closure disc 54 and flange 52, and between disc 54 and ring 56, respectively, to assure a leak-proof joint.

Since it is desired to destroy disc 54 at the same time as pipe section 12, the coil 55 is also connected to the primer cartridge 45 by a portion thereof extending outwardly of the disc 54.

The exterior surface of mounting member 50 is shown threaded at 59 for connection to a vessel (not shown) containing a supply of fire extinguishing fluid under pressure.

*Operation*

It is to be noted that the explosively operated deluge device of this invention may be operated from any suitable point, since the operating means therefor are not necessarily adjacent the device. When the switch 48a is closed by any means either manually or by a temperature or pressure responsive device, squib 46 will fire, igniting the primer cartridge 45 which in turn will detonate the lengths of cord-like high explosive or "Primacord" and disintegrate the length of frangible pipe 12 and closure disc 54. Fire extinguishing fluid, which may be either a liquid medium such as carbon tetrachloride, or a gaseous medium such as nitrogen, will flow into housing 24, which is leak proof, and will therefore enter the pipeline 11 in the downstream direction as well as extinguishing any fire from inflammable fluid entering the housing 24 from the fractured pipeline. Thus, the burning fluid will be purged from the line.

The device is simple in construction and the parts destroyed in use are inexpensive to replace. In addition to being light in weight, disc 54 is destroyed by a minimum of explosive force thereby permitting use of the device in structures of less strength and weight than conventional quick-acting valves actuated by explosive means. The device requires no mechanical moving parts and thus is particularly applicable to space use since premature actuation by *g*-forces is avoided.

The device may be arranged in various ways other than the construction shown, for instance, the explosive means for disintegrating the pipe section 12 and disc 54 may be detonated by duplicated circuits controlled by a single switch and duplicate initiating means 43, to guard against malfunctions.

Various other changes may be made by those skilled in the art in the illustrative embodiment of the invention described and shown in the drawings without departing from the scope of the invention as set forth in the appended claims.

We claim:

1. An explosive operated deluge device adapted to be mounted in a run of pipeline carrying inflammable material, comprising: a length of frangible pipe secured at each end, in leak-proof relation, to adjacent segments of the pipeline; a leak-proof housing enclosing said length of frangible pipe and mounted on the adjacent segments of the pipeline in leak-proof relation thereto; a tubular member sealed into a wall of said housing and adapted to admit fire extinguishing fluid into said housing; a frangible closure member mounted in said tubular member; explosive means to disintegrate said length of frangible pipe and said frangible closure member at the same time; and initiating means operated from outside of said housing to detonate said explosive means.

2. An axplosive operated deluge device as set forth in claim 1 and in which said explosive means comprise: explosive cords respectively incorporated with said length of frangible pipe and with said frangible closure member; said initiating means being mounted in a wall of the said housing and effective to detonate both the explosive cord incorporated with the length of frangible pipe and with the frangible closure member; and electrical means operated from outside said housing to fire said initiating means.

3. In combination; first conduit means having a passageway, an intermediate portion of said first conduit means being fabricated of frangible material; closure means encompassing said frangible intermediate portion of said first conduit means; a second conduit means having a passageway communicating with the interior of said closure means; frangible means obstructing the passageway of said second conduit means to block the passageway of said second conduit means; explosive means associated with said frangible intermediate portion of said first conduit means and said frangible means; whereby actuation of said explosive means will distintegrate said frangible intermediate portion and said frangible means to cause the passageway in said first conduit means to communicate with said closure means and to unblock the passageway of said second conduit means.

References Cited by the Examiner

UNITED STATES PATENTS

| | | | |
|---|---|---|---|
| 1,699,244 | 1/1929 | Lewis | 169—2 |
| 2,015,995 | 10/1935 | Egtvedt. | |
| 2,143,132 | 1/1939 | Salmond | 169—28 |
| 2,248,308 | 7/1941 | Rice. | |

(Other references on following page)

UNITED STATES PATENTS

| | | | |
|---|---|---|---|
| 2,537,074 | 1/1951 | Mapes | 169—2 |
| 2,736,459 | 2/1956 | Cockram et al. | |
| 2,808,114 | 10/1957 | Parker et al. | 169—28 X |
| 2,871,106 | 1/1959 | Crowley et al. | 169—4 |
| 3,088,478 | 5/1963 | Schimmel. | |

FOREIGN PATENTS 614,258  2/1961  Canada.

M. HENSON WOOD, Jr., *Primary Examiner.*

EUGENE F. BLANCHARD, RAPHAEL M. LUPO, EVERETT W. KIRBY, *Examiners.*

J. D. HUSSER, R. S. STROBEL, *Assistant Examiner.*